United States Patent [19]
Ogino et al.

[11] Patent Number: 4,910,766
[45] Date of Patent: Mar. 20, 1990

[54] QUASI RESERVATION-BASED COMMUNICATION SERVICE PROCESS SYSTEM

[75] Inventors: Nagao Ogino; Masanobu Fujioka, both of Saitama; Yoshikazu Ikeda, Tokyo, all of Japan

[73] Assignee: Kokusai Denshin Denwa Co., Ltd., Tokyo, Japan

[21] Appl. No.: 322,036

[22] Filed: Mar. 19, 1989

[30] Foreign Application Priority Data

Mar. 15, 1988 [JP] Japan .................................. 63-59416

[51] Int. Cl.⁴ ............................................ H04M 3/42
[52] U.S. Cl. .................................... 379/201; 379/243
[58] Field of Search ............... 379/219, 201, 203, 204, 379/205, 207, 209, 220, 243, 244

[56] References Cited

U.S. PATENT DOCUMENTS

| | | | |
|---|---|---|---|
| 4,455,455 | 6/1984 | Little | 379/203 |
| 4,805,166 | 2/1989 | Ardon et al. | 370/58 X |

*Primary Examiner*—James L. Dwyer
*Attorney, Agent, or Firm*—Armstrong, Nikaido, Marmelstein, Kubovcik & Murray

[57] ABSTRACT

In a communication system which handles both a demand call, and a reservation call which appoints the start time and the end time of the communication, the reservation call must be connected at the desired time even if the circuits are full of the demand calls. The service process node which has a data base storing the information of the reservation calls, tries to connect the reservation call repetitively until the scheduled end time of the reservation call in every predetermined pause, if the circuits are full of the demand calls. Also, when it is anticipated that the circuits would be full at the desired time, the service process node suggests to the subscriber the alternative time for reservation.

3 Claims, 5 Drawing Sheets

QUASI RESERVATION-BASED COMMUNICATION SERVICE PROCESS SYSTEM

BACKGROUND OF THE INVENTION

The present invention relates to a quasi reservation-based communication service processing system which may be used in various reservation communication services such as a time appointment service or the like in the communication network to which demand service calls are also applied.

Since an effective utilization of a communication network can be obtained by scheduling the call time, various reservation communication services such as a time appointment service in which communication is established at a scheduled time with the other party is prospective. As to the reservation communication service, the user (or subscriber) designates the desired communication start time and the end time to the communication network and the communication network accepts the reservation only when the connection of the reservation call is possible. On the other hand, in a narrow-band telephone service, etc., the demand communication service is already in service. For reasons of the traffic variations, and large grouping effects, etc, it is desirable to share the common circuit by both the demand service and the reservation service. A conventional reservation service process system assures the communication by registering the start time and the release time of the communication in the network system.

However, in the case of the above conventional reservation service processing system, when this system is applied to a communication network in which the demand service calls are mixed, the reservation call might not be established at a registered time depending on the condition of the demand service call. If we attempt to connect a reservation call at the scheduled time, the undesirable forced disconnection of a demand call at the time must be required.

SUMMARY OF THE INVENTION

It is an object, therefore, of the present invention to overcome the disadvantages and limitations of a prior reservation-based communication system by providing a new and improved reservation-based communication system.

It is also an object of the present invention to provide a reservation-based communication system in which a reservation call is always connected even if the circuits are full of the demand calls.

It is also an object of the present invention to provide a reservation-based communication system in which the network shows a subscriber a preferable reservation time, if the time zone desired by a subscriber will be full.

The above and other objects are attained by a quasi reservation-based communication system having; a communication network having exchanges each having a speech path apparatus and a control apparatus for said speech path apparatus, for establishing connection between subscribers coupled with said exchanges; a signal network having a service process node with a data base which stores service information, and a control apparatus for controlling said communication network; a plurality of subscribers each of which can access both of said communication network and said signal network; said communication network handling both a demand call and a reservation call; a subscriber registering a reservation call with a pair of subscribers for connection and reservation time zone, by accessing said service process node in said signal network; said service process node sending said control apparatus of said exchange a request signal asking connection of a reservation call at said reservation time zone; said service process node repeating said request until connection of said reservation call is established or all the reserved time zones elapse, when no circuit is available for the reservation call.

Further, the service process node suggests a subscriber an alternate time zone for reservation when a time zone requested by the subscriber will be full of reservations.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The preferred embodiment of the present invention will now be described with reference to the drawings.

Figure 1:
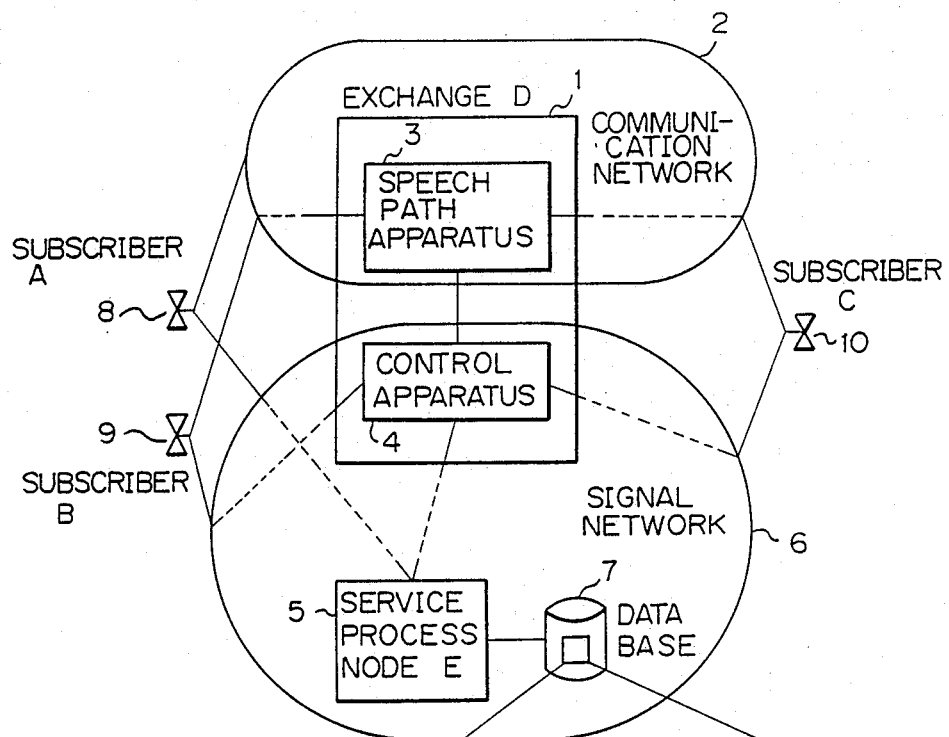
FIG. 1 shows a system diagram of a reservation-based communication system according to the present invention.

FIG. 1 is a stractural drawing showing an embodiment of the present invention. First of all, it comprises a communication network 2 in which a speech path apparatus 3 in each exchange 1 is connected to a subscriber 8 (9 or 10), and a signal network 6 having a control apparatus 4 in each exchange 1, a service process node 5 and a data base 6 which stores a service information for controlling the communication network 2. Each subscriber can access both the communication network 2 and the signal network 6. In the communication network 2, not only a demand call, but also a reservation call are applied.

Figure 2:
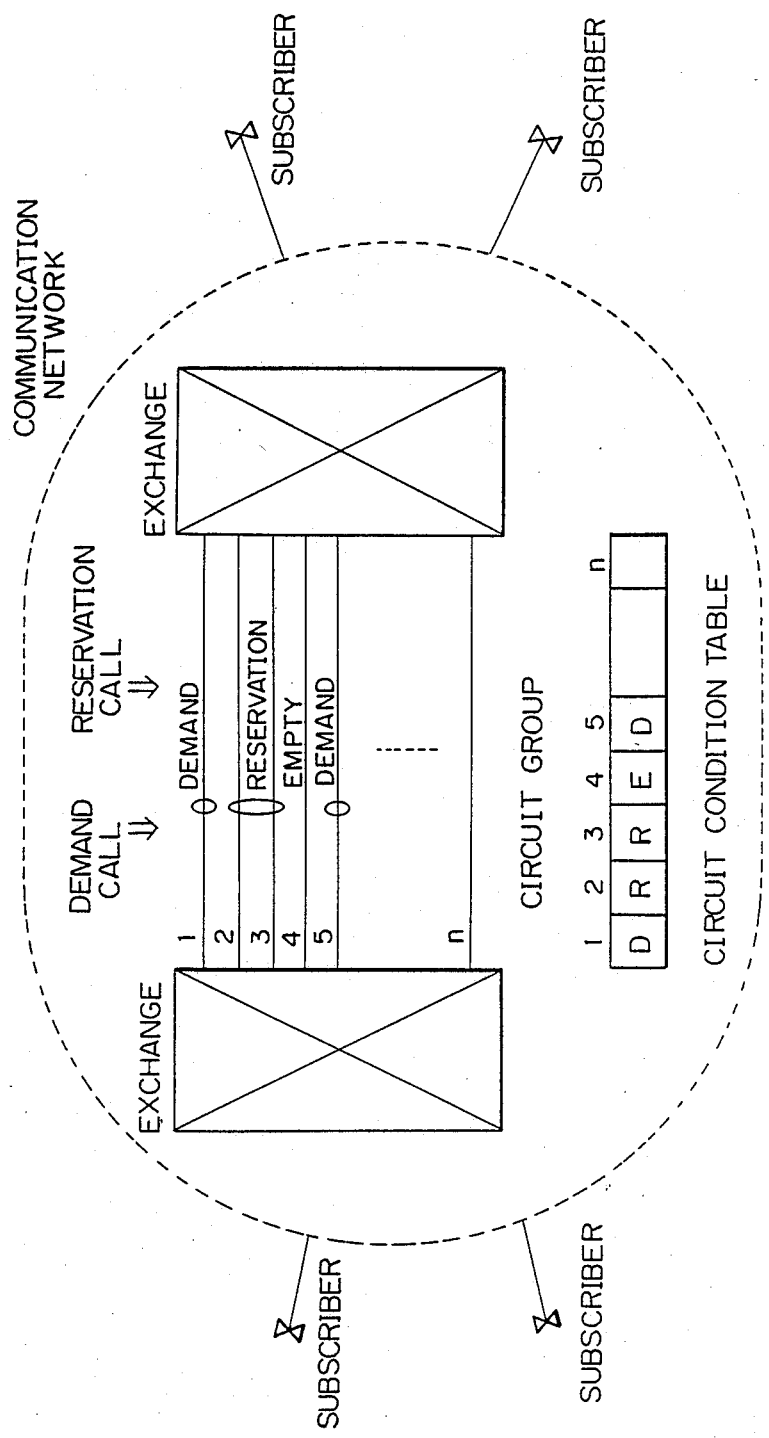
FIG. 2 shows an operation of a communication network which both a demand call and a reservation call are applied to, FIG. 3 a flow chart showing an operation for a reservation call in a service process node.

FIG. 2 shows the present communication network in which both a demand call and a reservation call are applied to each circuit. A demand call and a reservation call do not use the specific circuit, but share a common circuit, which is used by both a demand call and a reservation call.

In FIG. 2, it is supposed that the circuit 1 is now used for a demand service, the circuit 2 used for a reservation service, the circuit 3 for a reservation service. The circuit 4 is empty and is ready for use. The circuit 5 is used for a demand call. A usage table showing the condition of each circuit (demand service, reservation service, or empty) is provided in an exchange. When a new demand service or a reservation service is established, the empty circuit is used for that service.

Operation of this embodiment will now be described with reference to FIG. 1.

First, the subscriber 8 accesses the service process node 5 via the signal network 6 from, for example, the terminal A and transfers a request of the reservation call between the terminal B and the terminal C during the time zone n to the time zone n+x. Here, in the data base 7 of the service process node E, a reservation call control table 11 exists and upon the reception of the request from the subscriber A, the service process node E registers the request in the reservation call control table 11. That is, the reservation call number for identifying the reservation call, and the addresses of the terminal B and the terminal C to be connected are registered in the cells from the time zone n to the time zone n+x. The registration in the reservation control table 11 is performed in the order of arrival of the requests.

When it is time n, the service process node E sends the connection request of the reservation call registered in the column of time zone n of the reservation call control table 11, for example in the order of the reservation, to the exchange 1. In the case of FIG. 1, since the request that the terminal B and the terminal C are connected is entered in the column of the time zone n, the service process node E sends out an instruction to connect the terminal B and the terminal C to the exchange 1. Upon receiving the instruction, the exchange 1 executes the call establishing procedure between the terminal B and the terminal C. However, when a signal of the failure which shows that the connection is impossible because of all the circuits being full is returned from the exchange 1 to the service process node E, the service process node E sends the connection request of that call to the exchange 1 again after a predetermined pause. The service process node E repeats to send the connection request to the exchange 1 until the connection is accomplished successfully. Even when the time zone n elapses and the time zone n+1 comes, since the column of the time zone n+1 stores the entry that the terminal B and the terminal C are to be connected, the service process node E repeats to send the connection request to the exchange 1 until the successful call connection. The service process node E carries out said operation until the end of time zone n+x.

Then, when a signal of successful connection is returned from the exchange 1 to the service process node E, the service process node E deletes the registration of that call in the reservation call control table 11. That is to say, the registration of that call from the time zone n to the time zone n+x is deleted in order to prevent the wrong re-connection.

Figure 3:
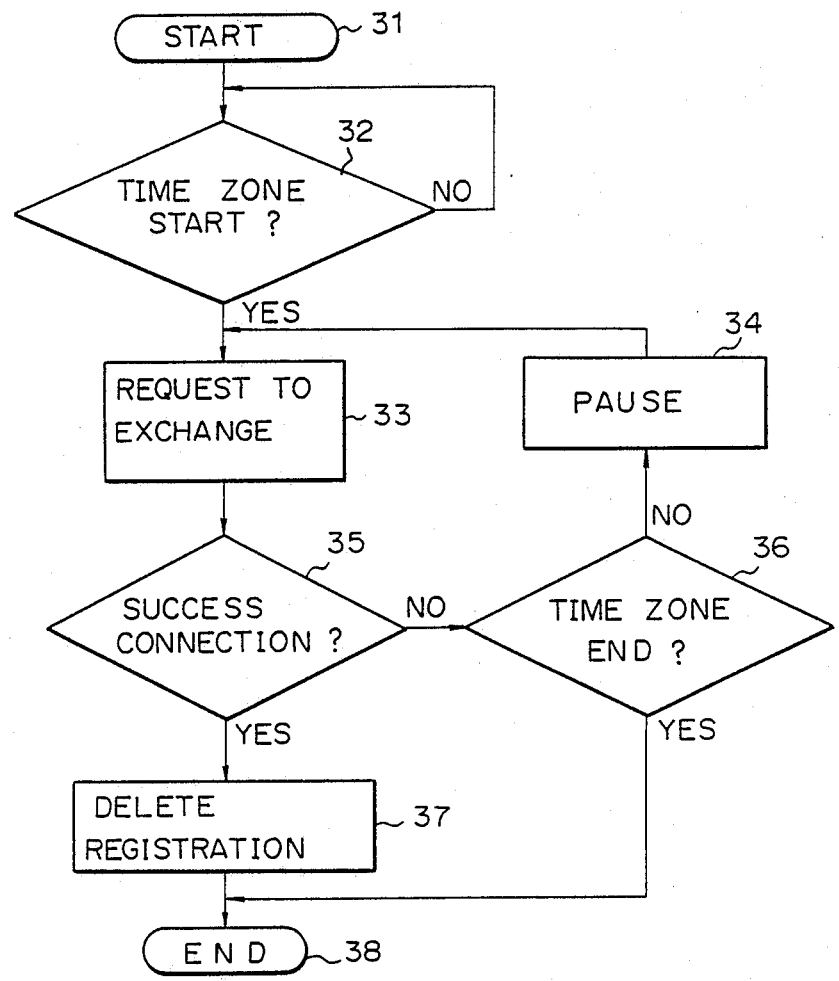

FIG. 3 shows the process flow of the reservation call in the service process node. The service process node reads out the reservation call control table 11, and awares if it is the start time of the reservation call (box 32 in FIG. 3). If it is in that time zone n, the service process node sends a connection request signal to the exchange 1. In the embodiment of FIG. 1, the service process node E sends the connection request of the subscriber B and the subscriber C to the exchange 1. If the exchange 1 returns the connection failure signal to the service process node E, the service process node E repeats the connection request of that call with a predetermined pause, unless the reserved end time elapses. In the embodiment of FIG. 1, the service process node E repeats the connection request in every predetermined pause to the exchange 1, unless the final time zone n+x elapses. When the final time zone n+x elapses, the process of that reservation call finishes. The reservation in that case is failure.

When the service process node E receives the connection success signal from the exchange 1, the registered reservation information in the table is removed, and the process of that call finishes. That is to say, in case of the connection success, the registered information from the time zone n to he time zone n+x is deleted.

Figure 4:
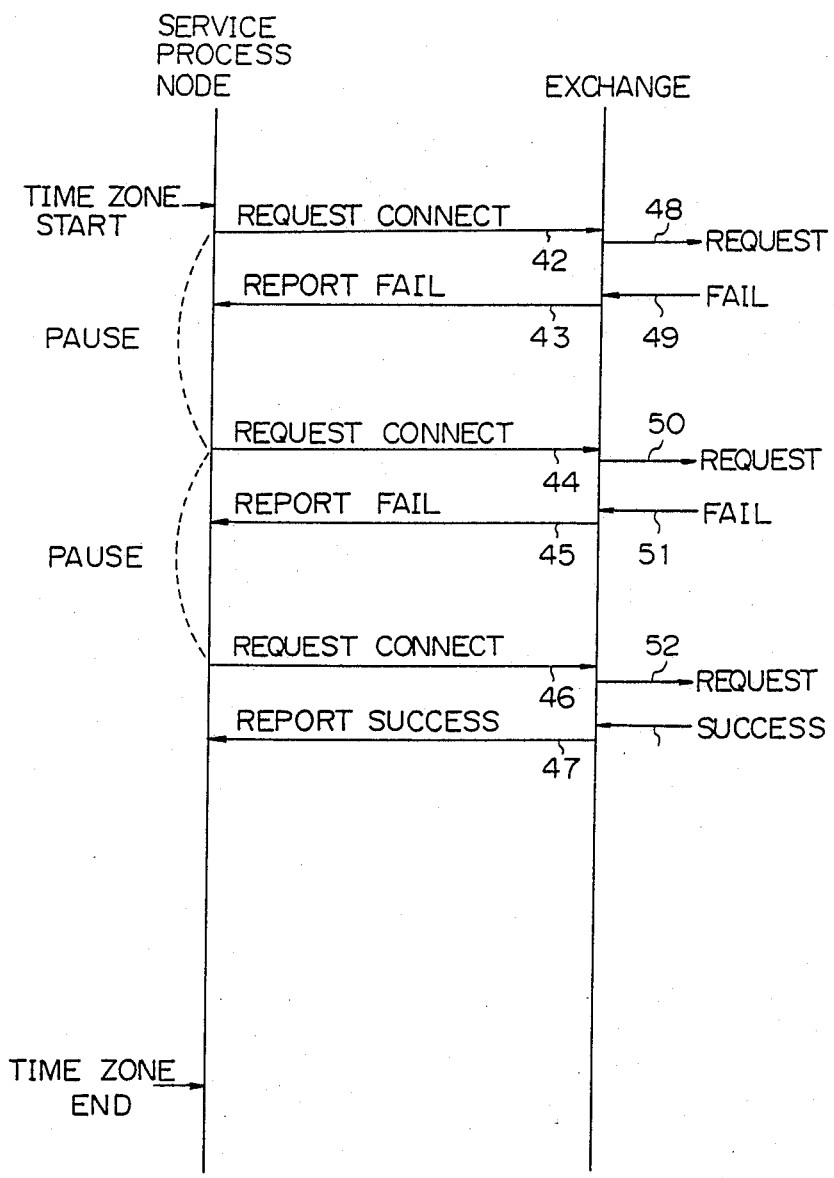
FIG. 4 shows a signal flow between a service process node and an exchange.

FIG. 4 shows the signal flow between the service process node E and the exchange 1. When it is the start time of the reservation call, the service process node E sends the exchange 1 the connection request of that reservation call (42 in FIG. 4). The exchange 1 tries the connection of that call (48 in FIG. 4). If it fails (49 in FIG. 4), the exchange 1 returns the fail report 43 to the service process node E, which requests the connection to the exchange again in a predetermined pause (44 in FIG. 4), then, the exchange 1 tries the connection again (50). If it fails again (51), the fail report 45 is returned to the service process node E.

Then, the service process node E sends the exchange 1 the connect request 46 again after a predetermined pause, and the exchange tries the connection (52 in FIG. 4). If it succeeds (53 in FIG. 4), the exchange 1 returns the service process node E the success report 47.

The service process node E repeats to send the connect request to the exchange in every predetermined pause if it receives the failure report, unless all the reserved time zones elapse.

In the above manner, the service process node keeps to send the reservation request periodically to the exchange until the successful report is received. Therefore, the reservation call is connected without affecting the demand calls.

Figure 5:
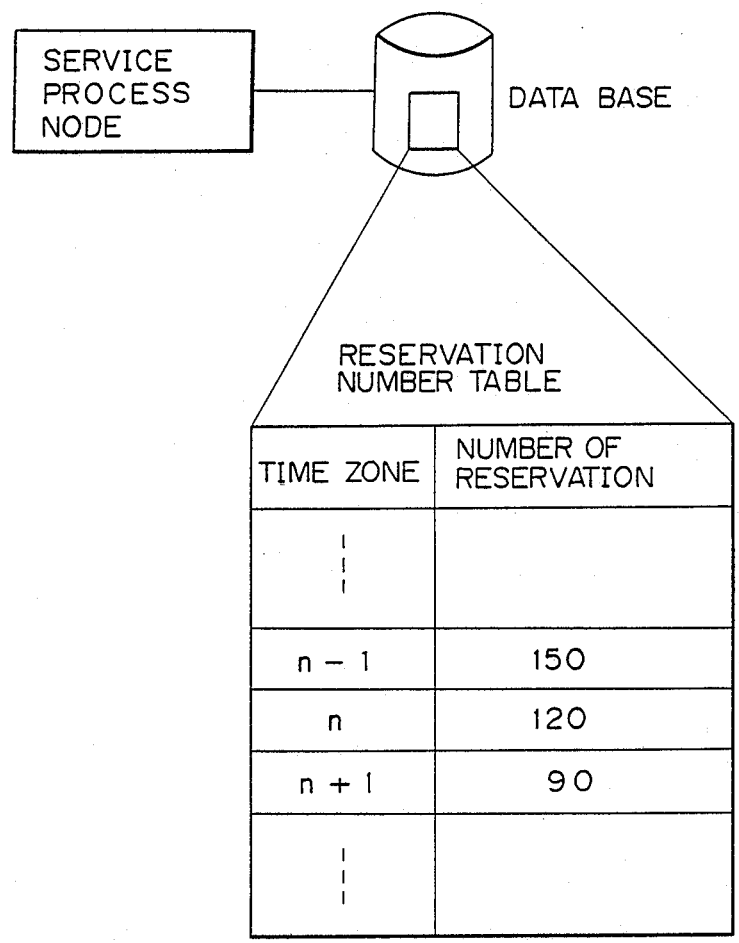
FIG. 5 shows a table storing a number of reservation calls in each time zone.

FIG. 5 is an illustration showing the contents of the table of the number of registrated reservation calls in the data base 7 of the service process node. As shown in FIG. 5, in the data base of the service process node there is a table of the number of registrated reservation calls storing the number of reservation calls in each time zone. The service process node judges that the circuit would overflow when the number of reservation calls exceeds the threshold value and that the connections of the reservation calls would not be assured. When the user desires such time zones which would be full, the service process node looks for a time zone which stores the reservation calls less than the threshold vale, near the desired time zone. Then, the service process node suggests the subscriber to reserve that time zone instead of his desired time zone.

For example, it is assumed that the threshold value of the number of the reservation calls which can assure the connection is 100 considering the number of circuits, and the subscriber requests to the service process node to start the communication at the time zone n. Since the number of the reservation calls at the time zone n is 120 which exceeds the threshold value of 100, the service process node finds that the connection of the reservation call cannot be assured. Therefore, the service process node finds a time zone which stores the reservations less than 100, and is the nearest to the subscriber's desired time zone n by reading ut the table of the number of reservation calls. In the case of FIG. 5, the time zone n+1 satisfies the above condition. Therefore, the service process node shows the time zone n+1 to the subscriber assuring the connection at the time zone n+1. The subscriber may register the time zone n+1 following the suggestion of the service process node, alternatively, he may register the initially requested time zone n with some risk that the connection may not be garanteed.

As mentioned above, the resources of the circuits are used effectively by the negotiation of the subscriber and the service process node concerning the reservation time.

As described above, according to the present invention, in a communication network having both the demand service calls add the reservation calls, the communication service with the complete call connection can be provided without affecting the demand service call.

In addition, the network resources are utilized effectively, by adjusting the reservation time between the subscribers and the communication network. And, the reservation service is assured without affecting other features of both the demand calls and the reservation calls.

From the foregoing it will now be apparent that a new and improved reservation communication system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A quasi reservation-based communication service process system comprising;

a communication network having exchanges each having a speech path apparatus and a control apparatus for said speech path apparatus, for establishing connection between subscribers coupled with said exchanges, a signal network having a service process node with a data base which stores service information, and a control apparatus, for controlling said communication network, a plurality of subscribers each of which can access both of said communication network and said signal network, said communication network handling both a demand call and a reservation call, a subscriber registering a reservation call with a pair of subscribers for connection and a reservation time zone, by accessing said service process node in said signal network, said service process node sending said control apparatus of said exchange a request signal asking connection of a reservation call at said reservation time zone, said service process node repeating said request until connection of said reservation call is established or all the reserved time zones elapse, when no circuit is available for the reservation call.

2. A quasi reservation-based communication service process system comprising;

a communication network having exchanges each having a speech path apparatus and a control apparatus for said speech path apparatus, for establishing connection between subscribers coupled with said exchanges, a signal network having a service process node with a data base which stores service information, and a control apparatus for controlling said communication network, a plurality of subscribers each of which can access both of said communication network and said signal network, said communication network handling both a demand call and a reservation call, a subscriber registering a reservation call with a pair of subscribers for connection and a reservation time zone, by accessing said service process node in said signal network, said service process node sending said control apparatus of said exchange a request signal asking connection of a reservation call at said reservation time zone, said service process node suggesting a subscriber an alternate time zone when a time zone requested by the subscriber stores more reservation than a predetermined value.

3. A quasi reservation-based communication service process system according to claim 2, wherein said service process node is implemented by a programmed computer, and said data base includes a reservation call control table having a plurality of memory cells for each time zone so that each of said memory cell stores reservation call number and a pair of subscribers to be connected, and a reservation number table having number of registrated reservation calls for each time zone.

* * * * *